(12) United States Patent
Moorman et al.

(10) Patent No.: US 8,568,262 B2
(45) Date of Patent: *Oct. 29, 2013

(54) TRANSMISSION HYDRAULIC CONTROL SYSTEM HAVING A MAIN LINE FEED ACCUMULATOR

(75) Inventors: Steven P. Moorman, Dexter, MI (US); Peter Donald Bock, Commerce Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 958 days.

This patent is subject to a terminal disclaimer.

(21) Appl. No.: 12/618,435

(22) Filed: Nov. 13, 2009

(65) Prior Publication Data

US 2011/0118081 A1    May 19, 2011

(51) Int. Cl.
*F16H 31/00*    (2006.01)

(52) U.S. Cl.
USPC .......................................................... 475/129

(58) Field of Classification Search
USPC .......... 475/129; 477/121, 138, 145, 146, 150
See application file for complete search history.

(56) References Cited

U.S. PATENT DOCUMENTS

| | | | | |
|---|---|---|---|---|
| 4,125,038 | A | * | 11/1978 | Hiramatsu ................... 477/117 |
| 5,542,888 | A | * | 8/1996 | Takada et al. ................ 475/134 |
| 5,626,533 | A | * | 5/1997 | Jang .............................. 475/129 |
| 2009/0275441 | A1 | * | 11/2009 | Bai ................................ 477/150 |
| 2011/0077124 | A1 | * | 3/2011 | Moorman et al. ............ 477/152 |

FOREIGN PATENT DOCUMENTS

| | | |
|---|---|---|
| DE | 19813982 A1 | 10/1999 |
| DE | 19921301 A1 | 11/1999 |
| DE | 19849488 A1 | 5/2000 |
| DE | 10243282 A1 | 4/2004 |
| DE | 102005029963 A1 | 2/2007 |
| EP | 0475488 A1 | 3/1992 |
| EP | 1826438 A2 | 8/2007 |

* cited by examiner

*Primary Examiner* — David D Le
*Assistant Examiner* — David J Hlavka

(57) ABSTRACT

A hydraulic control system for controlling a transmission includes an accumulator, a plurality of control devices, and a plurality of valves. The accumulator provides pressurized hydraulic fluid to a pressure control subsystem during an engine restart. The plurality of control devices includes solenoids and one way ball check valves. The plurality of valves include compensator feed valves, relay valves, and mode valves.

4 Claims, 12 Drawing Sheets

TRANSMISSION HYDRAULIC CONTROL SYSTEM HAVING A MAIN LINE FEED ACCUMULATOR

FIELD

The present disclosure relates to a transmission hydraulic control system having an accumulator, and more particularly to a transmission hydraulic control system having an accumulator that provides pressurized hydraulic fluid to a main line feed of the hydraulic control system during an engine restart.

BACKGROUND

The statements in this section merely provide background information related to the present disclosure and may or may not constitute prior art.

A typical automatic transmission includes a hydraulic control system that is employed to actuate a plurality of torque transmitting devices as well as provide cooling and lubrication to the components of the transmission. These torque transmitting devices may be, for example, friction clutches and brakes. The conventional hydraulic control system typically includes a main pump that provides a pressurized fluid, such as oil, to a plurality of valves and solenoids within a valve body. The main pump is driven by the engine of the motor vehicle. The valves and solenoids are operable to direct the pressurized hydraulic fluid through a hydraulic fluid circuit to the plurality of torque transmitting devices within the transmission. The pressurized hydraulic fluid delivered to the torque transmitting devices is used to engage or disengage the devices in order to obtain different gear ratios. In the case of hybrid powertrains using a combination of the internal combustion (IC) engine and electric propulsion, these transmissions have a separate auxiliary electric pump for providing the pressurized hydraulic fluid when the IC engine is turned off. While conventional hydraulic control systems are effective, there is room in the art for improved hydraulic control circuits that reduce the amount of complex components while improving efficiency and controllability of the system during restart of the IC engine.

SUMMARY

A hydraulic control system for actuating at least one torque transmitting device in a powertrain is provided. The powertrain includes an engine and a transmission. The hydraulic control system includes a source of pressurized hydraulic fluid powered by the engine, an accumulator, a plurality of control devices, and a plurality of valves. The accumulator provides pressurized hydraulic fluid to a pressure control subsystem during an engine restart. The plurality of control devices includes solenoids and one way ball check valves. The plurality of valves include compensator feed valves, relay valves, and mode valves.

In one example of the present invention, a valve assembly disables a clutch compensator feed circuit during discharge of the accumulator.

In another example of the present invention, a clutch compensator feed valve is disabled during discharge of the accumulator.

In another example of the present invention, a valve assembly is integrated into the accumulator to disable a clutch compensator feed circuit during discharge of the accumulator.

In yet another example of the present invention, a shift actuator and accumulator cooperate to provide pressurized hydraulic fluid during engine restart via a plurality of mode valves and a relay valve.

In yet another example of the present invention, a dual area shift actuator and accumulator cooperate to provide pressurized hydraulic fluid during engine restart via a plurality of mode valves and a relay valve.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
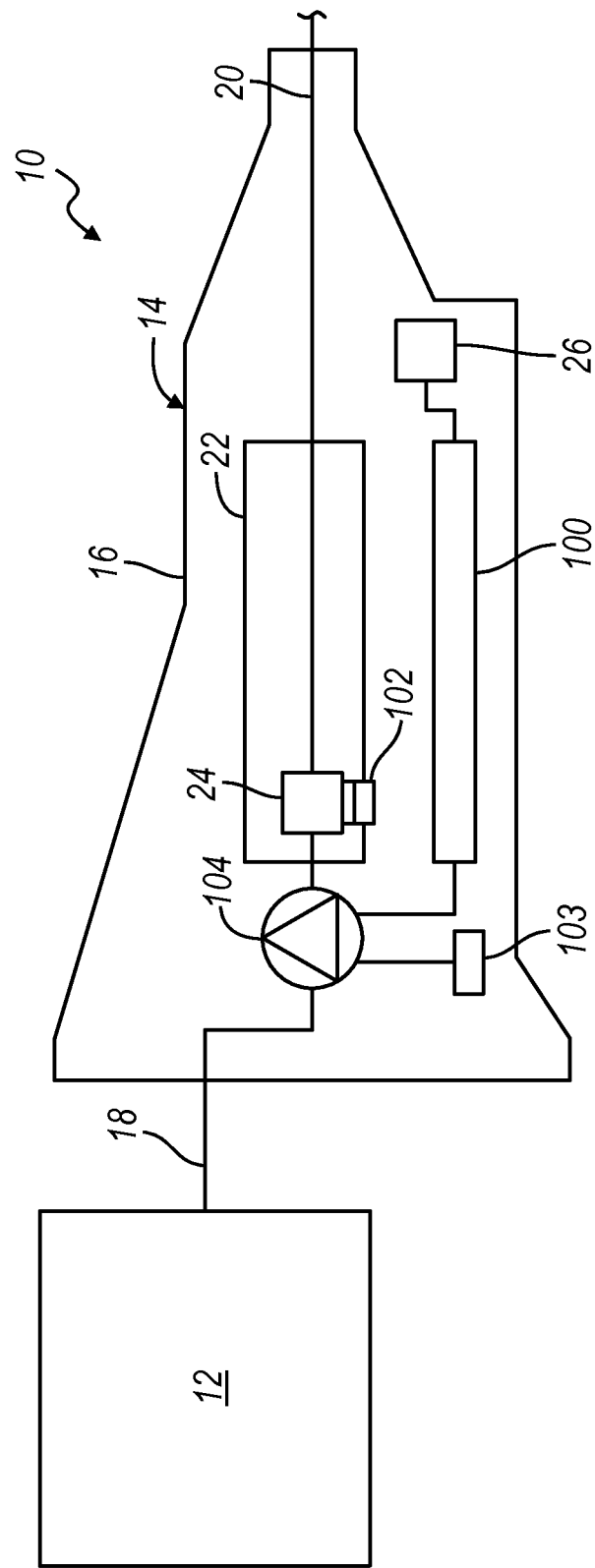
FIG. 1 is a schematic diagram of a powertrain having a hydraulic control system according to the principles of the present disclosure.

With reference to FIG. 1, an exemplary powertrain is generally indicated by reference number 10. The powertrain includes an engine 12 connected to a transmission 14. The engine 12 may be a conventional internal combustion engine or an electric engine, or any other type of prime mover, without departing from the scope of the present disclosure. In addition, additional components, such as hydrodynamic fluid driving devices such as torque converters and fluid couplings, may be disposed between the engine 12 and the transmission 14 without departing from the scope of the present disclosure. The engine 12 supplies a driving torque to the transmission 14.

The transmission 14 includes a typically cast, metal housing 16 which encloses and protects the various components of the transmission 14. The housing 16 includes a variety of apertures, passageways, shoulders and flanges which position and support these components. The transmission 14 includes an input shaft 18, an output shaft 20, and a gear and clutch arrangement 22. It should be appreciated that while the transmission 14 is illustrated as a rear wheel drive transmission, the transmission 14 may have other configurations without departing from the scope of the present disclosure. The input shaft 18 is connected with the engine 12 and receives input torque or power from the engine 12. The output shaft 20 is preferably connected with a final drive unit (not shown) which may include, for example, propshafts, differential assemblies, and drive axles. The input shaft 18 is coupled to and provides drive torque to the gear and clutch arrangement 22.

The gear and clutch arrangement 22 includes a plurality of gear sets and a plurality of shafts, neither of which is shown in detail. The plurality of gear sets may include individual intermeshing gears, such as planetary gear sets, that are connected to or selectively connectable to the plurality of shafts. The plurality of shafts may include layshafts or countershafts, sleeve and center shafts, reverse or idle shafts, or combinations thereof. It should be appreciated that the specific arrangement and number of the gear sets and the specific arrangement and number of the shafts within the transmission 14 may vary without departing from the scope of the present disclosure.

The gear and clutch arrangement 22 further includes at least one torque transmitting mechanism 24. In the example provided, the torque transmitting mechanism 24 is engageable to initiate a first gear or speed ratio by selectively coupling individual gears within the plurality of gear sets to the plurality of shafts. Accordingly, the torque transmitting mechanism 24 may be any type of clutch, including wet clutches, rotating clutches, etc., without departing from the scope of the present disclosure.

The transmission 14 also includes a transmission control module 26. The transmission control module 26 is preferably an electronic control device having a preprogrammed digital computer or processor, control logic, memory used to store data, and at least one I/O peripheral. The control logic includes a plurality of logic routines for monitoring, manipulating, and generating data. The transmission control module 26 controls the actuation of the torque transmitting mechanism 24 via a hydraulic control system 100 according to the principles of the present disclosure.

The hydraulic control system 100 is operable to selectively engage the torque transmitting device 24 by selectively communicating a hydraulic fluid to a shift actuating device 102 that engages the torque transmitting device 24, as will be described in greater detail below. The shift actuating device 102 may be a piston assembly or any other hydraulically actuatable mechanism without departing from the scope of the present disclosure. The hydraulic fluid is communicated to the shift actuating device 102 from a sump 103 under pressure via a pump 104 that is driven by the engine 12. Accordingly, the pump 104 is operable when the engine 12 is on or running and the pump 104 is inoperable when the engine 12 is off or not running. The pump 104 may be of various types, for example, a gear pump, a vane pump, a gerotor pump, or any other positive displacement pump.

Figure 2A:
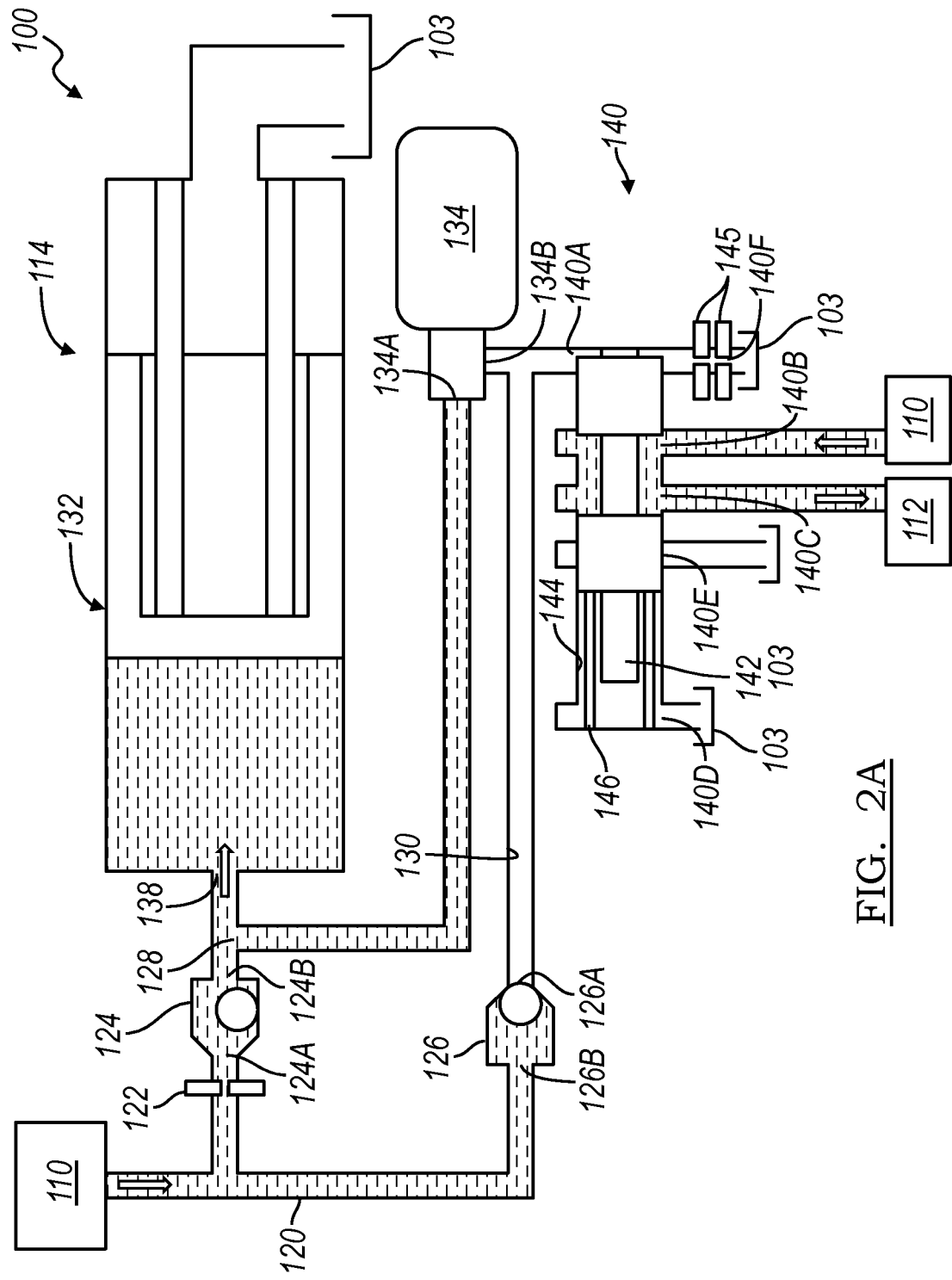
FIG. 2A is a diagram of an example of a hydraulic control system according to the principles of the present disclosure in an "engine on" mode of operation.
Figure 2B:
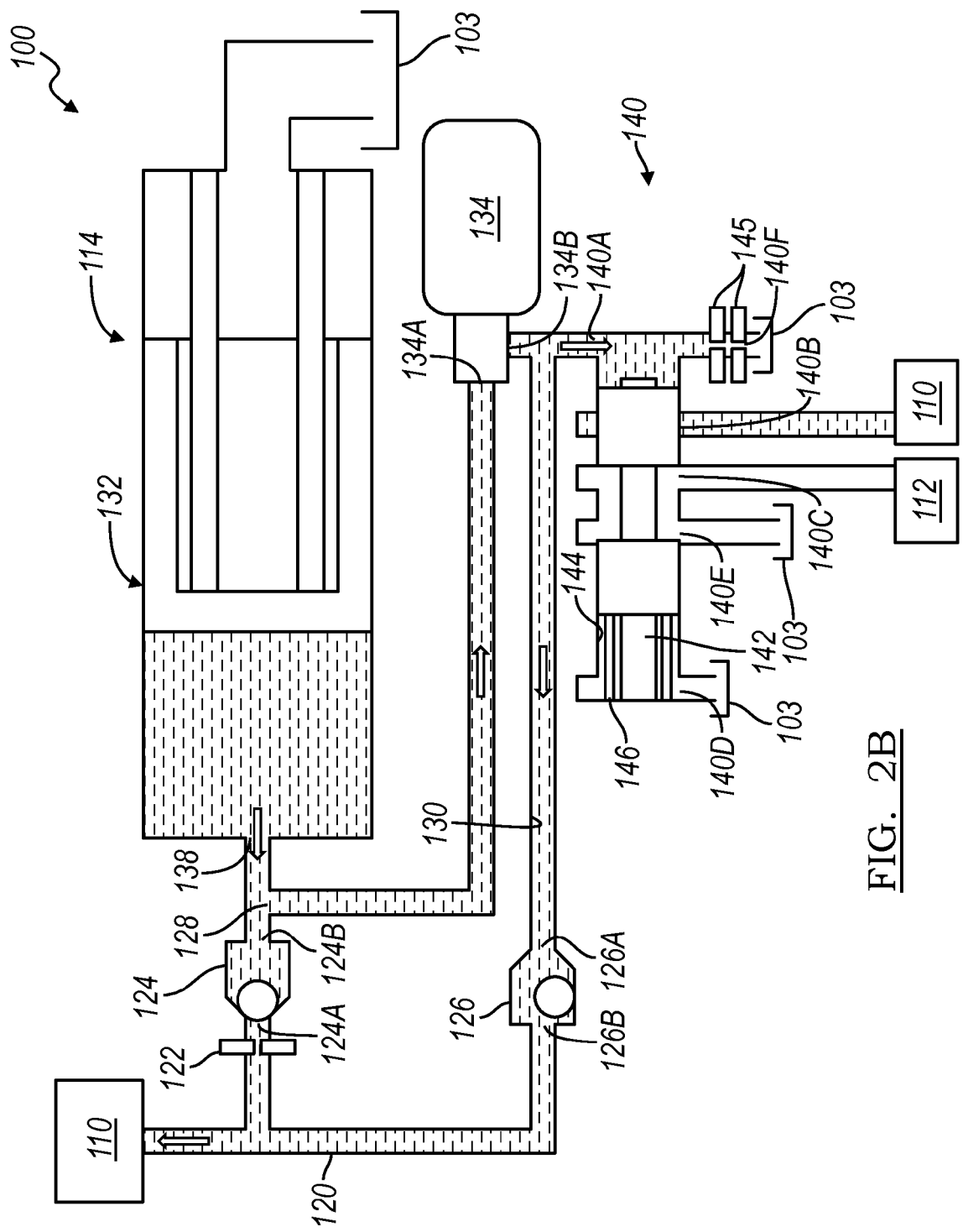
FIG. 2B is a diagram of the hydraulic control system of FIG. 2A in an "engine restart" mode of operation.

Turning to FIGS. 2A and 2B, a portion of the hydraulic control system 100 is illustrated in more detail. The hydraulic control system 100 includes a line pressure control subsystem 110, a compensator subsystem 112, and a line feed subsystem 114. It should be appreciated that the hydraulic control system 100 may include various other subsystems, such as actuator subsystems for actuating the torque transmitting device 24, a torque converter clutch (TCC) subsystem, a cooling subsystem, etc., without departing from the scope of the present invention. The line pressure control subsystem 110 is connected to the pump 104 and includes pressure regulator valves, solenoids, and other components operable to control the pressure of the hydraulic fluid from the pump 104. The compensator subsystem 112 is operable to balance centrifugal forces in a rotating clutch within the gear and clutch arrangement 22.

The line feed subsystem 114 is operable to provide pressurized hydraulic fluid to the line pressure control subsystem 110 when the pump 104 is deactivated or turned off, as will be described in greater detail below. The line feed subsystem 114 includes a fluid line 120 for communicating pressurized hydraulic fluid to and from the line pressure control subsystem 110. The fluid line 120 communicates through a flow restriction orifice 122 with a first ball check valve 124 and communicates with a second ball check valve 126. The first ball check valve 124 includes an inlet port 124A in communication with the fluid line 120 and an outlet port 124B in communication with a fluid line 128. The ball check valve 124 allows for fluid communication in one direction only. In the example provided, the ball check valve 124 allows for fluid communication from the inlet port 124A to the outlet port 124B and prevents fluid communication from the outlet port 124B to the inlet port 124A. It should be appreciated that other types of one way valves or other control devices may be employed in the location of the first ball check valve 124 without departing from the scope of the present disclosure.

The second ball check valve 126 includes an inlet port 126A in communication with the fluid line 120 and an outlet port 126B in communication with a fluid line 130. The ball check valve 126 allows for fluid communication in one direction only. In the example provided, the second ball check valve 126 allows for fluid communication from the inlet port 126A to the outlet port 126B and prevents fluid communication from the outlet port 126B to the inlet port 126A. It should be appreciated that other types of one way valves or other control devices may be employed in the location of the second ball check valve 126 without departing from the scope of the present disclosure.

The fluid line 128 communicates with an accumulator 132 and with a solenoid 134. The accumulator 132 is an energy storage device in which the non-compressible hydraulic fluid is held under pressure by an external source. In the example provided, the accumulator 132 is a spring type or gas filled type accumulator having a spring or compressible gas that provides a compressive force on the hydraulic fluid within the accumulator 132. However, it should be appreciated that the hydraulic accumulator 132 may be of other types without departing from the scope of the present invention. The accumulator 132 includes an inlet/outlet port 138 that allows the hydraulic fluid to communicate in and out of the accumulator 132. The inlet/outlet port 138 is in communication with the fluid line 128.

The solenoid 134 includes an inlet port 134A in communication with the fluid line 128 and an outlet port 134B in communication with the fluid line 130. The solenoid 134 is energized by the controller 26 to either open to allow fluid communication between the inlet port 134A and the outlet port 134B or to close to prevent fluid communication between the inlet port 134A and the outlet port 134B. The solenoid 134 is preferably a high flow, on/off solenoid. However, it should be appreciated that other types of solenoids and other control devices may be employed without departing from the scope of the present disclosure.

The fluid line 130 communicates with a compensator disable valve 140. The compensator disable valve 140 includes a spool valve 142 slidably disposed in a bore 144. The compensator disable valve 140 includes a control port 140A, an inlet port 140B, an outlet port 140C, and a plurality of exhaust ports 140D, 140E, and 140F. It should be appreciated that the compensator disable valve 140 may have various other ports and configurations without departing from the scope of the present disclosure. The control port 140A is in fluid communication with the fluid line 130. The inlet port 140B is in fluid communication with the line pressure control subsystem 110. The outlet port 140C is in fluid communication with the compensator subsystem 112. The exhaust ports 140D and 140E are in fluid communication with the sump 103 and the exhaust port 140F is in fluid communication with both the control port 140A and the sump 103 via a plurality of fluid restriction orifices 145.

The valve 142 is moveable between at least two positions including a de-stroked or first position, shown in FIG. 2A, and a stroked or second position, shown in FIG. 2B. The valve 142 is moved to the de-stroked position by a biasing member or spring 146 located at an end of the valve 142. The valve 142 is moved to the stroked position when pressurized hydraulic fluid communicated from the control port 140A exerts a force on an end of the valve 142 opposite the biasing member 146 that is sufficient to overcome the force exerted on the valve 142 by the biasing member 146. When the valve 142 is in the de-stroked position, the inlet port 140B is in fluid communication with the outlet port 140C. When the valve 142 is in the stroked position, as illustrated in FIG. 2B, the inlet port 140A is prevented from communicating with the outlet port 140C and the outlet port 140C is in communication with the sump through port 140E.

It should be appreciated that the plurality of fluid communication lines described above may be integrated in a valve body or formed from separate tubing or piping without departing from the scope of the present invention. In addition, the fluid communication lines may have any cross sectional shape and may include additional or fewer bends, turns, and branches than illustrated without departing from the scope of the present invention.

The operation of the hydraulic control system 100 will now be described. The hydraulic control system 100 operates in at least two modes: a first mode, shown in FIG. 2A, and a second mode, shown in FIG. 2B. In the first mode of operation, the engine 12 is on thereby operating the pump 104 and charging the line pressure control subsystem 110 and charging the accumulator 132. In the second mode of operation the engine 12 is off or restarting and the main pump 104 is not operating or operating at a condition that provides low pressure and the accumulator 132 is discharging in order to provide pressurized hydraulic fluid to the line pressure control subsystem 110.

With reference to FIG. 2A, during the first mode of operation when the pump 104 is operational, the pump 104 provides pressurized hydraulic fluid through fluid line 120. The hydraulic fluid from line 120 communicates through the first ball check valve 124 to charge the accumulator 132. To store the charge in the accumulator 132, the solenoid 134 is closed. The first ball check valve 124 and the solenoid 134 prevent hydraulic fluid from entering fluid line 130 and therefore the compensator disable valve 140 is in the de-stroked position. The second ball check valve 126 prevents hydraulic fluid from the line pressure control subsystem 110 from entering fluid line 130 and thereby disabling the feed to the compensator subsystem 112 by stroking the valve 142. Therefore, hydraulic fluid is able to communicate from the line pressure control subsystem 110 through the compensator disable valve 140 to the compensator subsystem 112.

With reference to FIG. 2B, when the motor vehicle stops (i.e., at a red light for example), the engine 12 shuts off and the main pump 104 stops rotating, so there is no pressure in the hydraulic circuit providing hydraulic fluid to the line pressure control subsystem 110, and therefore to the rest of the hydraulic control system 100. To start the motor vehicle without delay, the hydraulic circuit 100 must be filled with pressurized hydraulic fluid. Accordingly, during engine restart, solenoid 134 is opened and the accumulator 132 discharges. The hydraulic fluid from the accumulator 132 communicates through line 128, through the solenoid 134 and into fluid line 130. The hydraulic fluid within fluid line 130 communicates through the second ball check valve 126 and feeds the line pressure control subsystem 110, thereby providing pressurized hydraulic fluid to the components of the transmission 14. The hydraulic fluid within the fluid line 130 also communicates through the control port 140A of the compensator disable valve 140 and moves the valve 142 to the stroked position. Accordingly, the compensator disable valve 140 cuts off hydraulic fluid flow from the line pressure control subsystem 110 to the compensator subsystem 112, thereby reducing the hydraulic demands of the hydraulic control system 100 on the line pressure control subsystem 110 during an engine restart event.

Figure 2C:
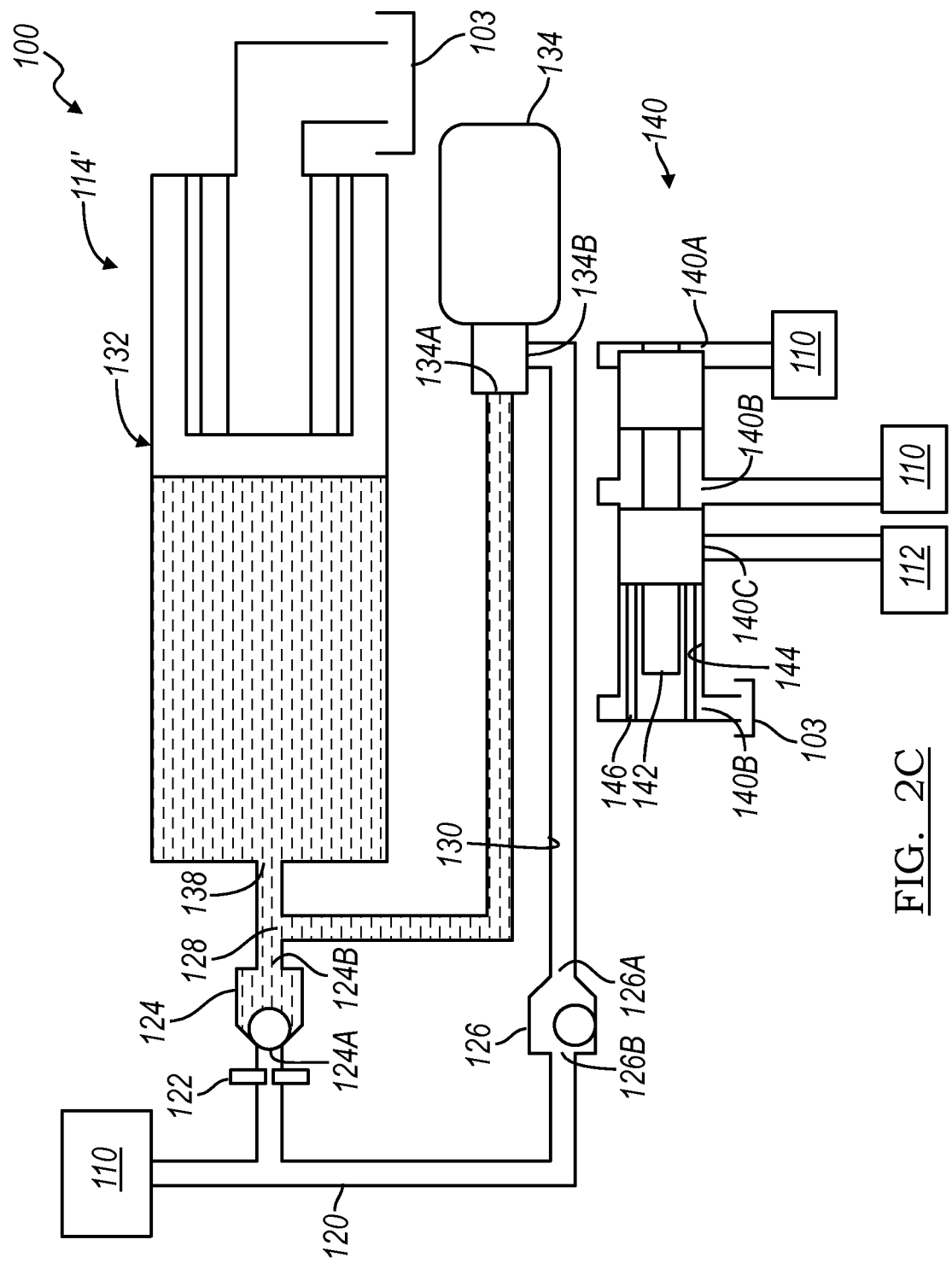
FIG. 2C is a diagram of another example of a hydraulic control system according to the principles of the present disclosure.

With reference to FIG. 2C, an alternate embodiment of a line feed subsystem is generally indicated by reference number 114'. The line feed subsystem 114' is similar to the line feed subsystem 114 shown in FIGS. 2A and 2B, and accordingly like components are indicated by like reference numbers. However, in the line feed subsystem 114', fluid line 130 does not connect with the control port 140A of the compensator disable valve 140 and the exhaust port 140E has been eliminated. Instead, control port 140A is in fluid communication with the line pressure control subsystem 110. In addition, the valve 142 is configured such that when the valve 142 is in the de-stroked position, the inlet port 140B is not in communication with the outlet port 140C and when the valve 142 is in the stroked position, the inlet port 140B is in fluid communication with the outlet port 140C.

During the first mode of operation when the pump 104 is operational, the pump 104 provides pressurized hydraulic fluid to the line pressure control subsystem 110 and to the control port 140A. The line pressure of the hydraulic fluid moves the valve 142 to the stroked position, and accordingly hydraulic fluid from the line pressure control subsystem 110 is allowed to communicate through the compensator disable valve 140 to the compensator subsystem 112. When the motor vehicle stops (i.e., at a red light for example), the engine 12 shuts off and the main pump 104 stops rotating, so there is no pressure in the hydraulic circuit providing hydraulic fluid to the line pressure control subsystem 110, and therefore to the rest of the hydraulic control system 100. Accordingly, during engine restart, the biasing member 146 moves the valve 142 to the de-stroked position, thereby preventing hydraulic fluid from the line pressure control subsystem 110 from entering the compensator subsystem 112 during engine restart. The compensator disable valve 140 will not return to the stroked position until such time as the fluid pressure within the line pressure control subsystem 110 reaches a threshold level sufficient to overcome the biasing member 146.

Figure 3A:
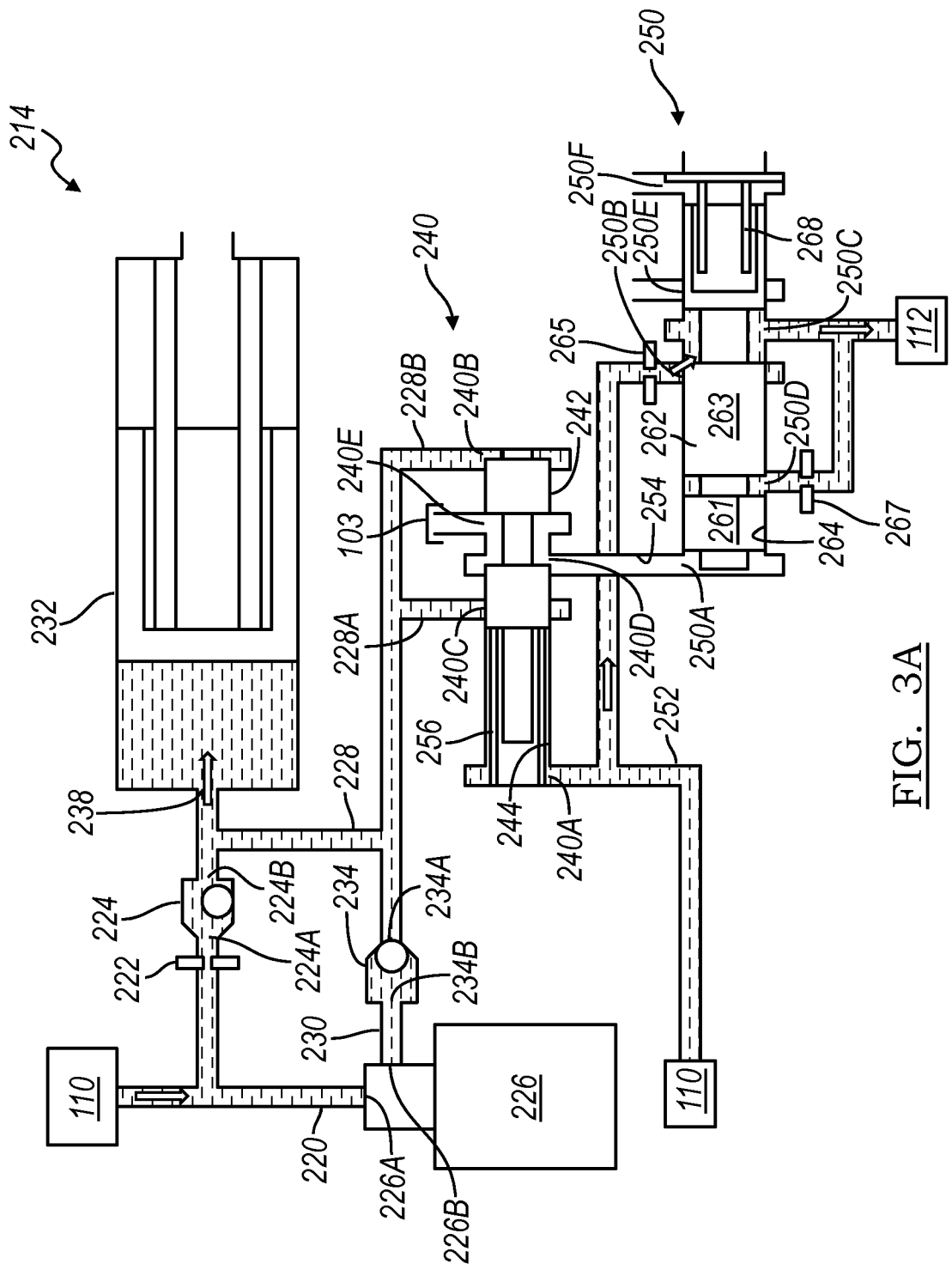
FIG. 3A is a diagram of another example of a hydraulic control system according to the principles of the present disclosure in an "engine on" mode of operation.
Figure 3B:
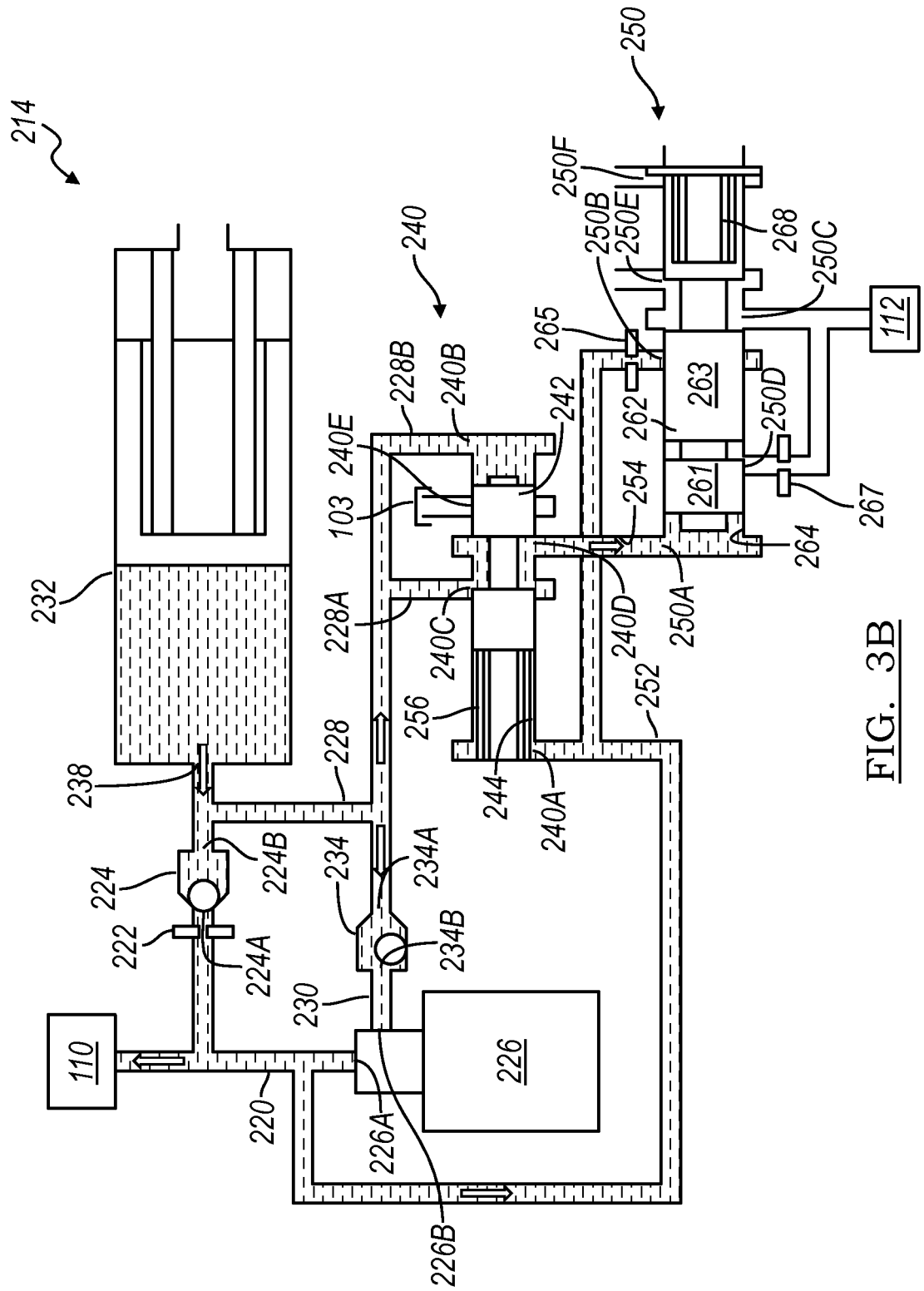
FIG. 3B is a diagram of the hydraulic control system of FIG. 3A in an "engine restart" mode of operation.

Turning to FIGS. 3A and 3B, another example of a line feed subsystem is generally indicated by reference number 214. The line feed subsystem 214 is operable to provide pressurized hydraulic fluid to the line pressure control subsystem 110 when the pump 104 is deactivated or turned off, as will be described in greater detail below. The line feed subsystem 214 includes a fluid line 220 for communicating pressurized hydraulic fluid to and from the line pressure control subsystem 110. The fluid line 220 communicates through a flow restriction orifice 222 with a first ball check valve 224 and communicates with a solenoid 226.

The first ball check valve 224 includes an inlet port 224A in communication with the fluid line 220 and an outlet port 224B in communication with a fluid line 228. The ball check valve 224 allows for fluid communication in one direction only. In the example provided, the ball check valve 224 allows for fluid communication from the inlet port 224A to the outlet port 224B and prevents fluid communication from the outlet port 224B to the inlet port 224A. It should be appreciated that other types of one way valves or other control devices may be employed in the location of the first ball check valve 224 without departing from the scope of the present disclosure.

The solenoid 226 includes an inlet port 226A in communication with the fluid line 220 and an outlet port 226B in communication with a fluid line 230. The solenoid 226 is energized by the controller 26 to either open to allow fluid communication between the inlet port 226A and the outlet port 226B or to close to prevent fluid communication between the inlet port 226A and the outlet port 226B. The solenoid 226 is preferably a high flow, on/off solenoid. However, it should be appreciated that other types of solenoids and other control devices may be employed without departing from the scope of the present disclosure.

The fluid line 228 communicates with an accumulator 232 and a second ball check valve assembly 234. The accumulator 232 includes an inlet/outlet port 238 that allows the hydraulic fluid to communicate in and out of the accumulator 232. The inlet/outlet port 238 is in communication with the fluid line 228. The second ball check valve 234 includes an inlet port 234A in communication with the fluid line 228 and an outlet port 234B in communication with a fluid line 230. The ball check valve 234 allows for fluid communication in one direction only. In the example provided, the second ball check valve 234 allows for fluid communication from the inlet port 234A to the outlet port 234B and prevents fluid communication from the outlet port 234B to the inlet port 234A. It should be appreciated that other types of one way valves or other control devices may be employed in the location of the second ball check valve 234 without departing from the scope of the present disclosure.

The fluid line 228 includes two branches 228A and 228B that each communicate with a relay valve 240. The relay valve 240 includes a spool valve 242 slidably disposed in a bore 244. The relay valve 240 includes control ports 240A and 240B, an inlet port 240C, an outlet port 240D, and an exhaust port 240E. It should be appreciated that the relay valve 240 may have various other ports and configurations without departing from the scope of the present disclosure. The control port 240A is in fluid communication with the line pressure control subsystem 110 and a compensator valve 250 via a fluid line 252. The control port 240B is in fluid communication with fluid line branch 228B. The inlet port 240C is in fluid communication with fluid line branch 228A. The outlet port 240D is in fluid communication with the compensator valve 250 via a fluid line 254. The exhaust port 240E is in fluid communication with the sump 103.

The valve 242 is moveable between at least two positions including a de-stroked or first position, shown in FIG. 3A, and a stroked or second position, shown in FIG. 3B. The valve 242 is moved to the de-stroked position by a biasing member or spring 256 located at an end of the valve 242 and by hydraulic fluid communicated to the control port 240A from the line pressure control subsystem 110. The valve 242 is moved to the stroked position when pressurized hydraulic fluid communicated from the control port 240B exerts a force on an end of the valve 242 opposite the biasing member 256 that is sufficient to overcome the force exerted on the valve 242 by the biasing member 256. When the valve 242 is in the de-stroked position, the inlet port 240C is not in fluid communication with the outlet port 240D and the outlet port 240D exhaust via exhaust port 240E. When the valve 242 is in the stroked position, as illustrated in FIG. 3B, the inlet port 240C is in communication with the outlet port 240D.

The compensator valve 250 includes a spool valve 262 slidably disposed in a bore 264. The spool valve 262 is a two part assembly having a first part 261 and a second part 263. The compensator valve 250 includes a control port 250A, an inlet port 250B, an outlet port 250C, a feedback port 250D, and exhaust ports 250E and 250F. It should be appreciated that the compensator valve 250 may have various other ports and configurations without departing from the scope of the present disclosure. The control port 250A is in fluid communication with the fluid line 254. The inlet port 250B is in fluid communication with fluid line 252 through a flow restriction orifice 265. The outlet port 250C and the feedback port 250D are in fluid communication with the compensator subsystem 112. The exhaust ports 250E and 250F are in fluid communication with the sump 103.

The valve 262 is moveable between at least two positions including a de-stroked or first position, shown in FIG. 3A, and a stroked or second position, shown in FIG. 3B. The valve 262 is moved to the de-stroked position by a biasing member or spring 268 located at an end of the valve 262. The valve 262 is moved to the stroked position when pressurized hydraulic fluid communicated from the control port 250A from the relay valve 240 exerts a force on an end of the valve 262 opposite the biasing member 268 that is sufficient to overcome the force exerted on the valve 262 by the biasing member 268. When the valve 262 is in the de-stroked position, the inlet port 250B is in fluid communication with the outlet port 250C. When the valve 262 is in the stroked position, as illustrated in FIG. 3B, the inlet port 250B is not in communication with the outlet port 250C. The outlet port 250C is in communication with exhaust port 250E. In addition, the feedback port 250D opens and allows feedback pressure to act on the valve 262 in order to keep the valve 262 in a regulating position when the relay valve 240 is in the de-stroked position.

Again, it should be appreciated that the plurality of fluid communication lines described above may be integrated in a valve body or formed from separate tubing or piping without departing from the scope of the present invention. In addition, the fluid communication lines may have any cross sectional shape and may include additional or fewer bends, turns, and branches than illustrated without departing from the scope of the present invention.

The operation of the line feed subsystem 214 will now be described. The line feed subsystem 214 operates in at least two modes: a first mode, shown in FIG. 3A, and a second mode, shown in FIG. 3B. In the first mode of operation, the engine 12 is on thereby operating the pump 104 and charging the line pressure control subsystem 110 and charging the accumulator 232. In the second mode of operation the engine 12 is off or restarting and the main pump 104 is not operating or operating at a condition that provides low pressure and the accumulator 232 is discharging in order to provide pressurized hydraulic fluid to the line pressure control subsystem 110.

With reference to FIG. 3A, during the first mode of operation when the pump 104 is operational, the pump 104 provides pressurized hydraulic fluid through fluid line 220. The hydraulic fluid from line 220 communicates through the first ball check valve 224 to charge the accumulator 232. To store the charge in the accumulator 232, the solenoid 226 is closed. Hydraulic fluid from the line pressure control subsystem 110 communicates to the relay valve 240 via fluid line 252. The force on the valve 242 from the hydraulic fluid from the control port 240B is not sufficient to overcome the combined force on the valve 242 from the hydraulic fluid from the control port 240A and the biasing member 256, and accordingly hydraulic fluid is not communicated from the relay valve 240 to the compensator valve 250. The biasing member 268 in the compensator valve 250 keeps the valve 262 in the de-stroked position. Therefore, hydraulic fluid is able to communicate from the line pressure control subsystem 110 through the compensator valve 250 to the compensator subsystem 112. Hydraulic fluid enters the feedback port 250D through a flow restriction orifice 267 and contacts the valve 262, moving the valve 262 to a balanced positioned that regulates the flow of hydraulic fluid from the inlet port 250B to the outlet port 250C.

With reference to FIG. 3B, when the motor vehicle stops (i.e., at a red light for example), the engine 12 shuts off and the main pump 104 stops rotating, so there is no pressure in the hydraulic circuit providing hydraulic fluid to the line pressure control subsystem 110, and therefore to the rest of the hydraulic control system 100. To start the motor vehicle without delay, the hydraulic circuit 100 must be filled with pressurized hydraulic fluid. Accordingly, during engine restart, solenoid 226 is opened and the accumulator 232 discharges. The hydraulic fluid from the accumulator 232 communicates through line 228, through the second ball check valve 234, through the solenoid 226, and into the line pressure control subsystem 110 via fluid line 220. The hydraulic fluid within fluid line 228 also communicates through the control port 240B of the relay valve 240. The force of the hydraulic fluid via control port 240B is greater than the force exerted on the valve 242 by the biasing member 256 and the reduced pressure of the hydraulic fluid fed from the accumulator 232 through the line pressure control subsystem 110. Therefore, the valve 242 is moved to the stroked position. Hydraulic fluid from fluid line 228 is allowed to communicate through the relay valve to the compensator valve 250 via fluid line 254, thereby moving the compensator valve 250 to the stroked position. Accordingly, the compensator valve 250 cuts off hydraulic fluid flow from the line pressure control subsystem 110 to the compensator subsystem 112, thereby reducing the hydraulic demands of the hydraulic control system 100 on the line pressure control subsystem 110 during an engine restart event.

Figure 4A:
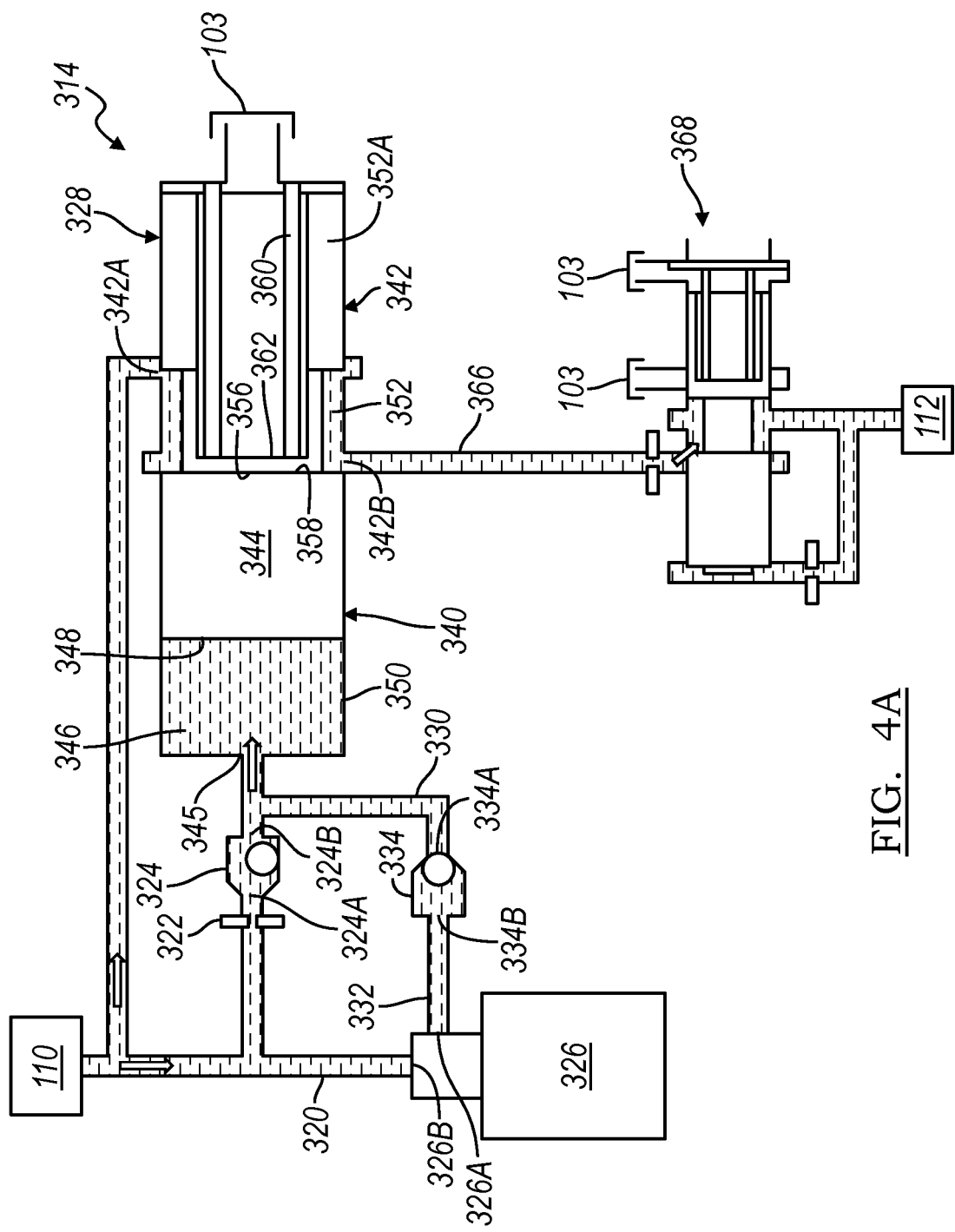
FIG. 4A is a diagram of an example of a hydraulic control system according to the principles of the present disclosure in an "engine on" mode of operation.
Figure 4B:
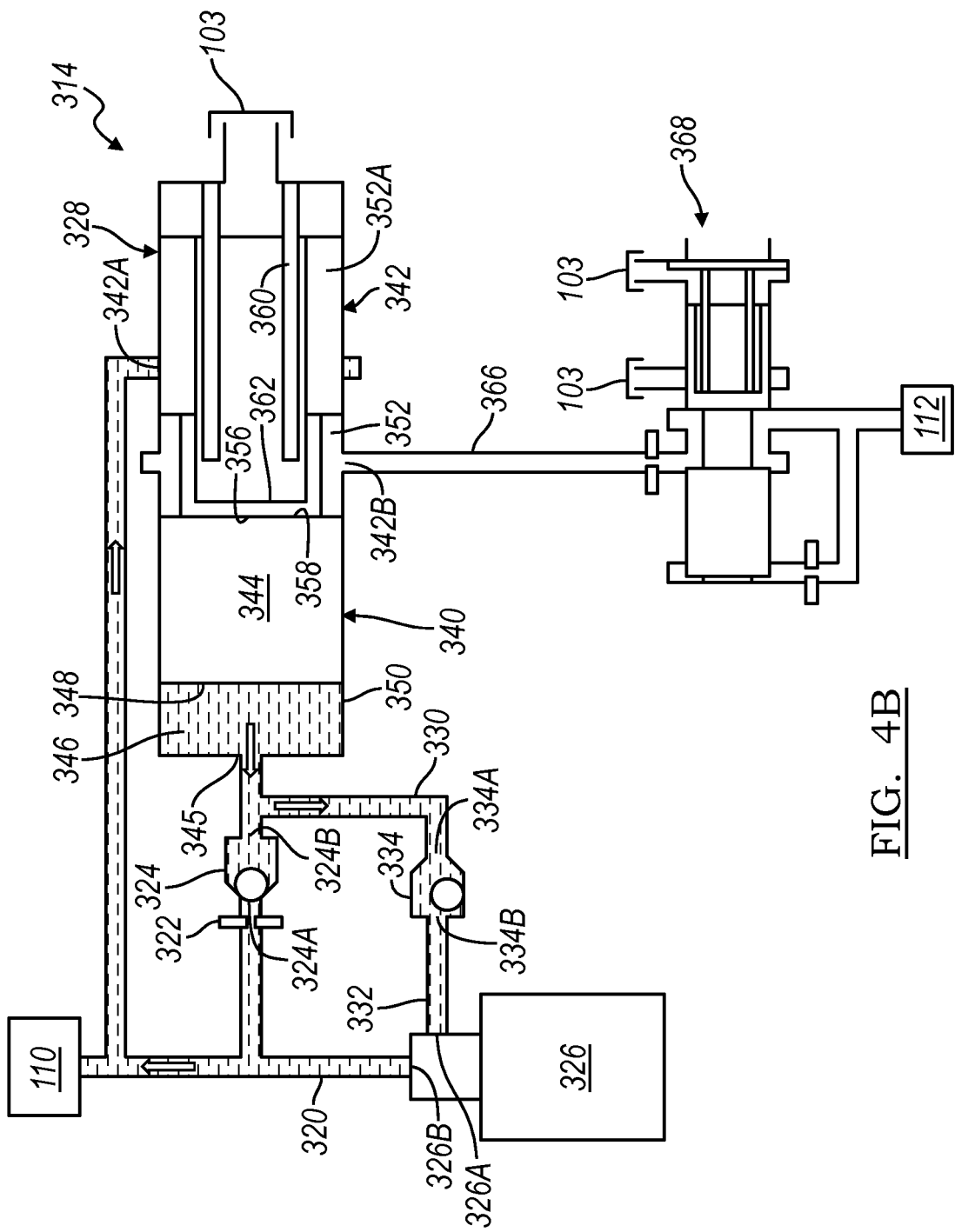
FIG. 4B is a diagram of the hydraulic control system of FIG. 4A in an "engine restart" mode of operation.

With reference to FIGS. 4A and 4B, another example of a line feed subsystem is indicated by reference number 314. The line feed subsystem 314 is operable to provide pressurized hydraulic fluid to the line pressure control subsystem 110 when the pump 104 is deactivated or turned off, as will be described in greater detail below. The line feed subsystem 314 includes a fluid line 320 for communicating pressurized hydraulic fluid to and from the line pressure control subsystem 110. The fluid line 320 communicates through a flow restriction orifice 322 with a first ball check valve 324 and communicates with a solenoid 326 and an accumulator valve assembly 328.

The first ball check valve 324 includes an inlet port 324A in communication with the fluid line 320 and an outlet port 324B in communication with a fluid line 330. The ball check valve 324 allows for fluid communication in one direction only. In the example provided, the ball check valve 324 allows for fluid communication from the inlet port 324A to the outlet port 324B and prevents fluid communication from the outlet port 324B to the inlet port 324A. It should be appreciated that other types of one way valves or other control devices may be employed in the location of the first ball check valve 324 without departing from the scope of the present disclosure.

The solenoid 326 includes an inlet port 326A in communication a fluid line 332 and an outlet port 326B in communication with the fluid line 320. The solenoid 326 is energized by the controller 26 to either open to allow fluid communication between the inlet port 326A and the outlet port 326B or to close to prevent fluid communication between the inlet port 326A and the outlet port 326B. The solenoid 326 is preferably a high flow, on/off solenoid. However, it should be appreciated that other types of solenoids and other control devices may be employed without departing from the scope of the present disclosure.

The fluid line 330 communicates with a second ball check valve assembly 334 and the accumulator valve assembly 328. The second ball check valve 334 includes an inlet port 334A in communication with the fluid line 330 and an outlet port 334B in communication with the fluid line 332. The ball check valve 334 allows for fluid communication in one direction only. In the example provided, the second ball check valve 334 allows for fluid communication from the inlet port 334A to the outlet port 334B and prevents fluid communication from the outlet port 334B to the inlet port 334A. It should be appreciated that other types of one way valves or other control devices may be employed in the location of the second ball check valve 334 with out departing from the scope of the present disclosure.

The accumulator valve assembly 328 includes an accumulator 340 integrated with a valve assembly 342. The accumulator 340 includes a piston 344 slidably disposed within a bore 346. A first end 348 of the piston 344 and the bore 346 cooperate to define an accumulator cavity 350. The accumulator 340 further includes an inlet/outlet port 345 that allows the hydraulic fluid to communicate in and out of the accumulator 340. The inlet/outlet port 345 is in communication with the fluid line 330 and the accumulator cavity 350. The valve assembly 342 includes a valve 352 slidably disposed within the bore 346. The valve 352 includes at least one land 352A. An end 356 of the valve 352 is in contact with, or is connected to, a second end 358 of the piston 344 of the accumulator 340. A biasing member or spring 360 acts on an end 362 of the valve 352 opposite the end 356 in contact with the accumulator 340. The valve assembly 342 further includes an inlet port 342A and an outlet port 342B. The inlet port 342A is in communication with the fluid line 320. The outlet port 342B is in fluid communication with a fluid line 366. The fluid line 366 is in fluid communication with a one-piece compensator feed valve 368. The compensator feed valve 368 is operable to regulate the pressure of hydraulic fluid to the compensator feed subsystem 112.

The piston 344 and the valve 352 are moveable between a charge position, shown in FIG. 4A, and a discharge position, shown in FIG. 4B. When in the charged position, the piston 344 and the valve 352 act against the biasing member 360 and the inlet port 342A is in communication with the outlet port 342B. When in the discharge, the piston 344 and the valve 352 are moved by the biasing member 360 and the land 352A of the valve 352 blocks the inlet port 342A, thereby preventing fluid communication between the inlet port 342A and the outlet port 342B.

Again, it should be appreciated that the plurality of fluid communication lines described above may be integrated in a valve body or formed from separate tubing or piping without departing from the scope of the present invention. In addition, the fluid communication lines may have any cross sectional shape and may include additional or fewer bends, turns, and branches than illustrated without departing from the scope of the present invention.

The operation of the line feed subsystem 314 will now be described. The line feed subsystem 314 operates in at least two modes: a first mode, shown in FIG. 4A, and a second mode, shown in FIG. 4B. In the first mode of operation, the engine 12 is on thereby operating the pump 104 and charging the line pressure control subsystem 110 and charging the accumulator 350. In the second mode of operation the engine 12 is off or restarting and the main pump 104 is not operating or operating at a condition that provides low pressure and the accumulator 350 is discharging in order to provide pressurized hydraulic fluid to the line pressure control subsystem 110.

With reference to FIG. 4A, during the first mode of operation when the pump 104 is operational, the pump 104 provides pressurized hydraulic fluid through fluid line 320. The hydraulic fluid from line 320 communicates through the first ball check valve 324 and moves the piston 344 of the accumulator 340 and the valve 352 to the charge position. To store the charge in the accumulator 340, the solenoid 326 is closed. Hydraulic fluid from the fluid line 320 also communicates through the valve assembly 342 to the compensator feed valve 368, thereby providing pressurized hydraulic fluid to the compensator subsystem 112.

With reference to FIG. 4B, when the motor vehicle stops (i.e., at a red light for example), the engine 12 shuts off and the main pump 104 stops rotating, so there is no pressure in the hydraulic circuit providing hydraulic fluid to the line pressure control subsystem 110, and therefore to the rest of the hydraulic control system 100. To start the motor vehicle without delay, the hydraulic circuit 100 must be filled with pressurized hydraulic fluid. Accordingly, during engine restart, solenoid 326 is opened and the accumulator 340 discharges. During discharge, the biasing member 360 moves the piston 344 and the valve 352 to the discharge position. The hydraulic fluid from the accumulator 340 communicates through line 330, through the second ball check valve 334, through the solenoid 326, and into the line pressure control subsystem 110 via fluid line 320. The hydraulic fluid within fluid line 320 is prevented from communicating through the valve assembly 342 since the valve 352 is in the discharge position, thereby preventing the inlet port 342A from communicating with the outlet port 342B. Accordingly, the valve assembly 342 cuts off hydraulic fluid flow from the accumulator 340 to the compensator subsystem 112, thereby reducing the hydraulic demands of the hydraulic control system 100 on the line pressure control subsystem 110 during an engine restart event.

Figure 5A:
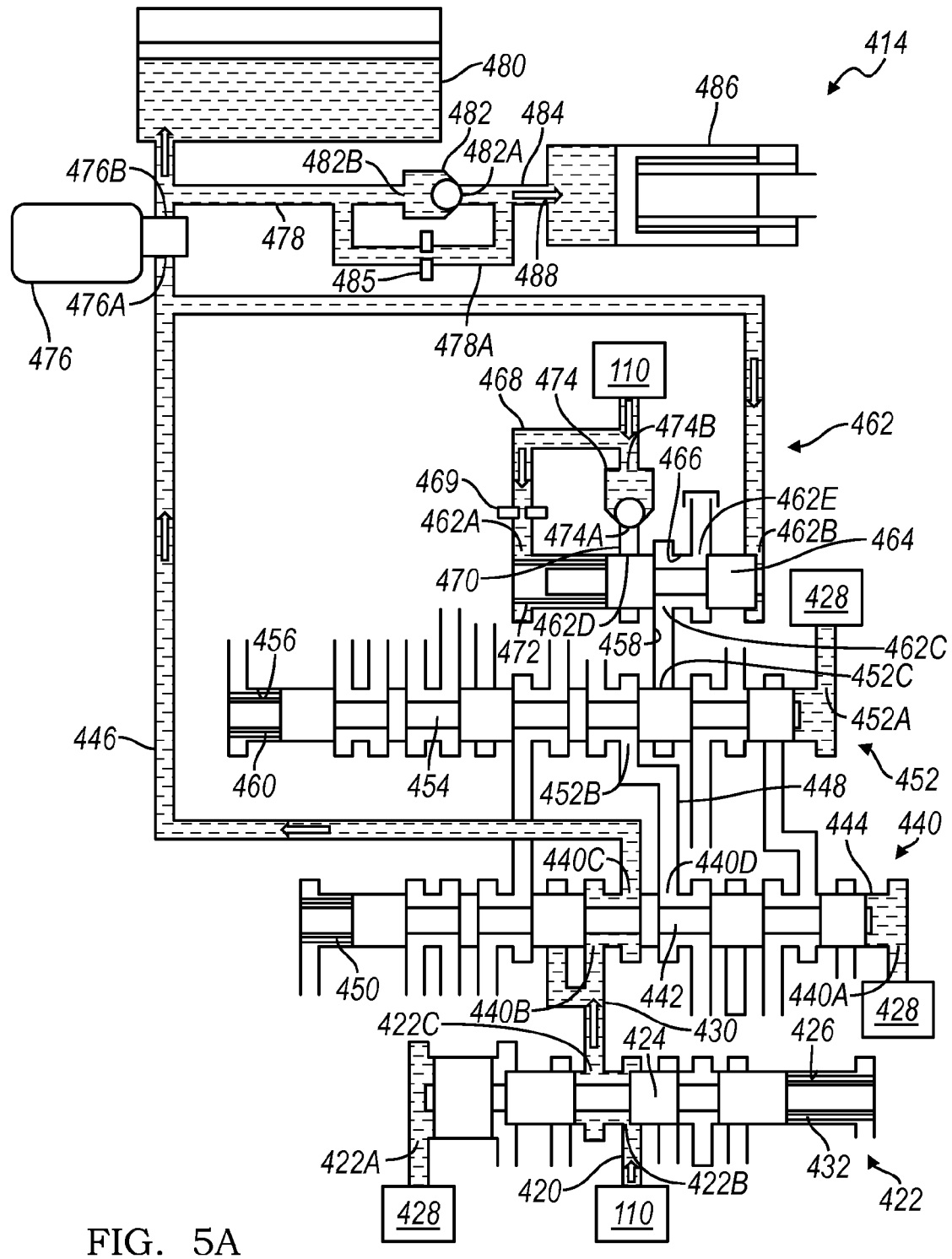
FIG. 5A is a diagram of an example of a hydraulic control system according to the principles of the present disclosure in an "engine on" mode of operation.
Figure 5B:
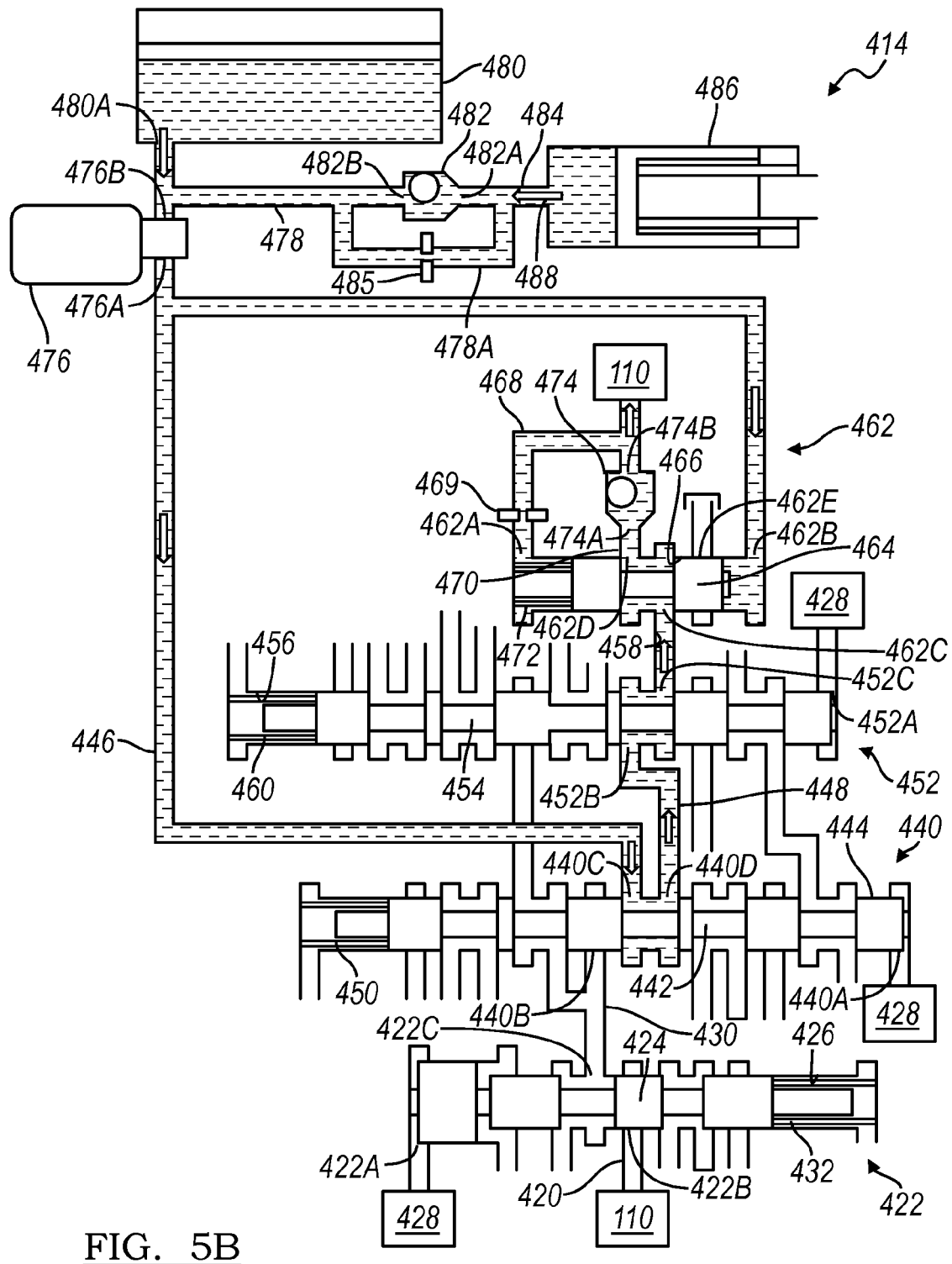
FIG. 5B is a diagram of the hydraulic control system of FIG. 5A in an "engine restart" mode of operation.

With reference to FIGS. 5A and 5B, another example of a line feed subsystem is indicated by reference number 414. The line feed subsystem 414 is operable to provide pressurized hydraulic fluid to the line pressure control subsystem 110 when the pump 104 is deactivated or turned off, as will be described in greater detail below. The line feed subsystem 414 includes a fluid line 420 for communicating pressurized hydraulic fluid to and from the line pressure control subsystem 110. The fluid line 420 communicates with a first valve 422.

The first valve 422 is preferably a clutch regulation valve and includes a spool valve 424 slidably disposed in a bore 426. The first valve 422 includes at least a control port 422A, an inlet port 422B, and an outlet port 422C. It should be appreciated that the first valve 422 may have various other ports and configurations without departing from the scope of the present disclosure. The control port 422A is in fluid communication with a valve actuation subsystem 428. The valve actuation subsystem 428 includes solenoids and other devices used to control the flow of hydraulic fluid to various valves within the hydraulic control system 100. The valve actuation subsystem 428 is fed via the line pressure control subsystem 110. The inlet port 422B is in fluid communication with fluid line 420. The outlet port 422C is in fluid communication with a fluid line 430.

The valve 424 is moveable between at least two positions including a de-stroked or first position, shown in FIG. 5B, and a stroked or second position, shown in FIG. 5A. The valve 424 is moved to the de-stroked position by a biasing member or spring 432 located at an end of the valve 424. The valve 424 is moved to the stroked position when pressurized hydraulic fluid communicated from the control port 422A from the valve actuation subsystem 428 exerts a force on an end of the valve 424 opposite the biasing member 432 that is sufficient to overcome the force exerted on the valve 424 by the biasing member 432. When the valve 424 is in the de-stroked position, as illustrated in FIG. 5B, the inlet port 422B is not in fluid communication with the outlet port 422C. When the valve 424 is in the stroked position, as illustrated in FIG. 5A, the inlet port 422B is in communication with the outlet port 422C.

The fluid line 430 is in fluid communication with a second valve 440. The second valve 440 is preferably a mode valve used to select one or more torque transmitting devices in the transmission 14. The second valve 440 includes a spool valve 442 slidably disposed in a bore 444. The second valve 440 includes at least a control port 440A, an inlet port 440B, a first outlet port 440C, and a second outlet port 440D. It should be appreciated that the second valve 440 may have various other ports and configurations without departing from the scope of the present disclosure. The control port 440A is in fluid communication with the valve actuation subsystem 428. The inlet port 440B is in fluid communication with fluid line 430. The first outlet port 440C is in fluid communication with a fluid line 446. The second outlet port 440D is in fluid communication with a fluid line 448.

The valve 442 is moveable between at least two positions including a de-stroked or first position, shown in FIG. 5B, and a stroked or second position, shown in FIG. 5A. The valve 442 is moved to the de-stroked position by a biasing member or spring 450 located at an end of the valve 442. The valve 442 is moved to the stroked position when pressurized hydraulic fluid communicated from the control port 440A from the valve actuation subsystem 428 exerts a force on an end of the valve 442 opposite the biasing member 450 that is sufficient to overcome the force exerted on the valve 442 by the biasing member 450. When the valve 442 is in the de-stroked position, as illustrated in FIG. 5B, the inlet port 440B is not in fluid communication with the outlet ports 440C and 440D, however, the outlet port 440C is in fluid communication with the outlet port 440D. When the valve 442 is in the stroked position, as illustrated in FIG. 5A, the inlet port 440B is in communication with the outlet port 440C and the outlet port 440D is isolated.

The fluid line 448 is in fluid communication with a third valve 452. The third valve 452 is preferably a mode valve used to select one or more torque transmitting devices in the transmission 14. The third valve 452 includes a spool valve 454 slidably disposed in a bore 456. The third valve 452 includes at least a control port 452A, an inlet port 452B, and an outlet port 452C. It should be appreciated that the third valve 452 may have various other ports and configurations without departing from the scope of the present disclosure. The control port 452A is in fluid communication with the valve actuation subsystem 428. The inlet port 452B is in fluid communication with the fluid line 448. The outlet port 452C is in fluid communication with a fluid line 458.

The valve 454 is moveable between at least two positions including a de-stroked or first position, shown in FIG. 5B, and a stroked or second position, shown in FIG. 5A. The valve 454 is moved to the de-stroked position by a biasing member or spring 460 located at an end of the valve 454. The valve 454 is moved to the stroked position when pressurized hydraulic fluid communicated from the control port 452A from the valve actuation subsystem 428 exerts a force on an end of the valve 454 opposite the biasing member 460 that is sufficient to overcome the force exerted on the valve 454 by the biasing member 460. When the valve 454 is in the de-stroked position, as illustrated in FIG. 5B, the inlet port 452B is in fluid communication with the outlet port 452C. When the valve 454 is in the stroked position, as illustrated in FIG. 5A, the inlet port 452B is not in communication with the outlet port 452C.

The fluid line 458 is in fluid communication with a relay valve 462. The relay valve 462 includes a spool valve 464 slidably disposed in a bore 466. The third valve 462 includes control ports 462A and 462B, an inlet port 462C, an outlet port 462D, and an exhaust port 462E. It should be appreciated that the relay valve 462 may have various other ports and configurations without departing from the scope of the present disclosure. The control port 462A is in fluid communication with the line pressure control subsystem 110 via a fluid line 468 and an orifice 469. The control port 462B is in fluid communication with the fluid line 446. The inlet port 462C is in fluid communication with the fluid line 458. The outlet port 462D is in fluid communication with a fluid line 470. The exhaust port 462E is in fluid communication with the sump 103.

The valve 464 is moveable between at least two positions including a de-stroked or first position, shown in FIG. 5A, and a stroked or second position, shown in FIG. 5B. The valve 464 is moved to the de-stroked position by a biasing member or spring 472 located at an end of the valve 464 and by pressurized hydraulic fluid from the line pressure control subsystem 110 delivered via control port 462A acting on the same end of the valve 464 as the biasing member 472. The valve 464 is moved to the stroked position when pressurized hydraulic fluid communicated from the control port 462B exerts a force on an end of the valve 464 opposite the biasing member 472 that is sufficient to overcome the force exerted on the valve 464 by the biasing member 472 and a reduced flow of hydraulic fluid from the line pressure subsystem 110. When the valve 464 is in the de-stroked position, as illustrated in FIG. 5A, the inlet port 462C is in fluid communication with the exhaust port 462E. When the valve 464 is in the stroked position, as illustrated in FIG. 5B, the inlet port 462C is in fluid communication with the outlet port 462D.

Fluid line 470 is in fluid communication with a first ball check valve 474. The first ball check valve 474 includes an inlet port 474A in communication with the fluid line 470 and an outlet port 474B in communication with the fluid line 468. The ball check valve 474 allows for fluid communication in one direction only. In the example provided, the ball check valve 474 allows for fluid communication from the inlet port 474A to the outlet port 474B and prevents fluid communication from the outlet port 474B to the inlet port 474A. It should be appreciated that other types of one way valves or other control devices may be employed in the location of the first ball check valve 474 without departing from the scope of the present disclosure.

Fluid line 446 is in fluid communication with a solenoid 476. The solenoid 476 includes an inlet port 476A in communication the fluid line 446 and an outlet port 476B in communication with a fluid line 478. The solenoid 476 is energized by the controller 26 to either open to allow fluid communication between the inlet port 476A and the outlet port 476B or to close to prevent fluid communication between the inlet port 476A and the outlet port 476B. The solenoid 476 is preferably a high flow, on/off solenoid. However, it should be appreciated that other types of solenoids and other control devices may be employed without departing from the scope of the present disclosure.

The fluid line 478 communicates with a clutch actuator 480 and with a second ball check valve assembly 482. The clutch actuator 480 is a spring biased piston assembly that, when pressurized with hydraulic fluid, engages a torque transmitting mechanism in the transmission 14. The clutch actuator 480 includes an inlet/outlet port 480A in fluid communication with the fluid line 478. The second ball check valve 482 includes an inlet port 482A in communication with a fluid line 484 and an outlet port 482B in communication with the fluid line 478. The ball check valve 482 allows for fluid communication in one direction only. In the example provided, the second ball check valve 482 allows for fluid communication from the inlet port 482A to the outlet port 482B and prevents fluid communication from the outlet port 482B to the inlet port 482A. It should be appreciated that other types of one way valves or other control devices may be employed in the location of the second ball check valve 482 without departing from the scope of the present disclosure. The fluid line 478 includes a branch 478A that communicates with the fluid line 484 via an orifice 485. Accordingly, the orifice 485 is disposed in parallel with the second ball check valve 482.

The fluid line 484 communicates with an accumulator 486. The accumulator 486 includes an inlet/outlet port 488 that allows the hydraulic fluid to communicate in and out of the accumulator 486. The inlet/outlet port 488 is in communication with the fluid line 484.

Again, it should be appreciated that the plurality of fluid communication lines described above may be integrated in a valve body or formed from separate tubing or piping without departing from the scope of the present invention. In addition, the fluid communication lines may have any cross sectional shape and may include additional or fewer bends, turns, and branches than illustrated without departing from the scope of the present invention.

The operation of the line feed subsystem 414 will now be described. The line feed subsystem 414 operates in at least two modes: a first mode, shown in FIG. 5A, and a second mode, shown in FIG. 5B. In the first mode of operation, the engine 12 is on thereby operating the pump 104 and charging the line pressure control subsystem 110 and charging the accumulator 486 and the clutch actuator 480. In the second mode of operation the engine 12 is off or restarting and the main pump 104 is not operating or operating at a condition that provides low pressure and the accumulator 486 and the clutch actuator 480 are discharging in order to provide pressurized hydraulic fluid to the line pressure control subsystem 110.

With reference to FIG. 5A, during the first mode of operation when the pump 104 is operational, the pump 104 provides pressurized hydraulic fluid to the line pressure control subsystem 110 and therefore the valve actuator subsystem 428. The valve actuator subsystem 428 moves each of the valves 422, 440, and 452 to the stroked positions. Therefore, the line pressure control subsystem 110 provides pressurized hydraulic fluid to fluid line 420 which passes through the first valve 422 and through the second valve 440 to fluid line 446. The hydraulic fluid from line 446 communicates through the solenoid 476 which is commanded open. The hydraulic fluid from the solenoid 476 communicates to the clutch actuator 480 and engages the clutch actuator 480 and communicates through the orifice 485 to charge the accumulator 486. To store the charge in the accumulator 486 and the clutch actuator 480, the solenoid 476 is closed. Hydraulic fluid from the line pressure control subsystem 110 communicates to the relay valve 462 via fluid line 468. The force on the valve 464 from the hydraulic fluid from the control port 462B is not sufficient to overcome the combined force on the valve 464 from the hydraulic fluid from the control port 462A and the biasing member 472, and accordingly the relay valve 462 is in the de-stroked position.

With reference to FIG. 5B, when the motor vehicle stops (i.e., at a red light for example), the engine 12 shuts off and the main pump 104 stops rotating, so there is no pressure in the hydraulic circuit providing hydraulic fluid to the line pressure control subsystem 110, and therefore to the rest of the hydraulic control system 100. To start the motor vehicle without delay, the hydraulic circuit 100 must be filled with pressurized hydraulic fluid. Accordingly, during engine restart, solenoid 476 is opened and the accumulator 486 and the clutch actuator 480 discharge. In addition, since the valve actuator subsystem 428 is not fed hydraulic fluid from the line pressure control subsystem 110, the valves 422, 440, and 452 move to their de-stroked positions. The hydraulic fluid from the accumulator 486 communicates through line 484, through the second ball check valve 482, to the solenoid 476. The hydraulic fluid from the solenoid 476 communicates through line 446 to the relay valve 462. The force of the hydraulic fluid via control port 462B is greater than the force exerted on the valve 464 by the biasing member 472 and the reduced pressure of the hydraulic fluid fed from the accumulator 486 and clutch actuator 480 through the line pressure control subsystem 110. Therefore, the valve 464 is moved to the stroked position. Hydraulic fluid from fluid line 446 is diverted by the second valve 440 into fluid line 448 and communicates to the third valve 452. The hydraulic fluid from the third valve 452 communicates via fluid line 458 communicates through the relay valve 462, through the first ball check valve 474, and on to the line pressure control subsystem 110.

Figure 6A:
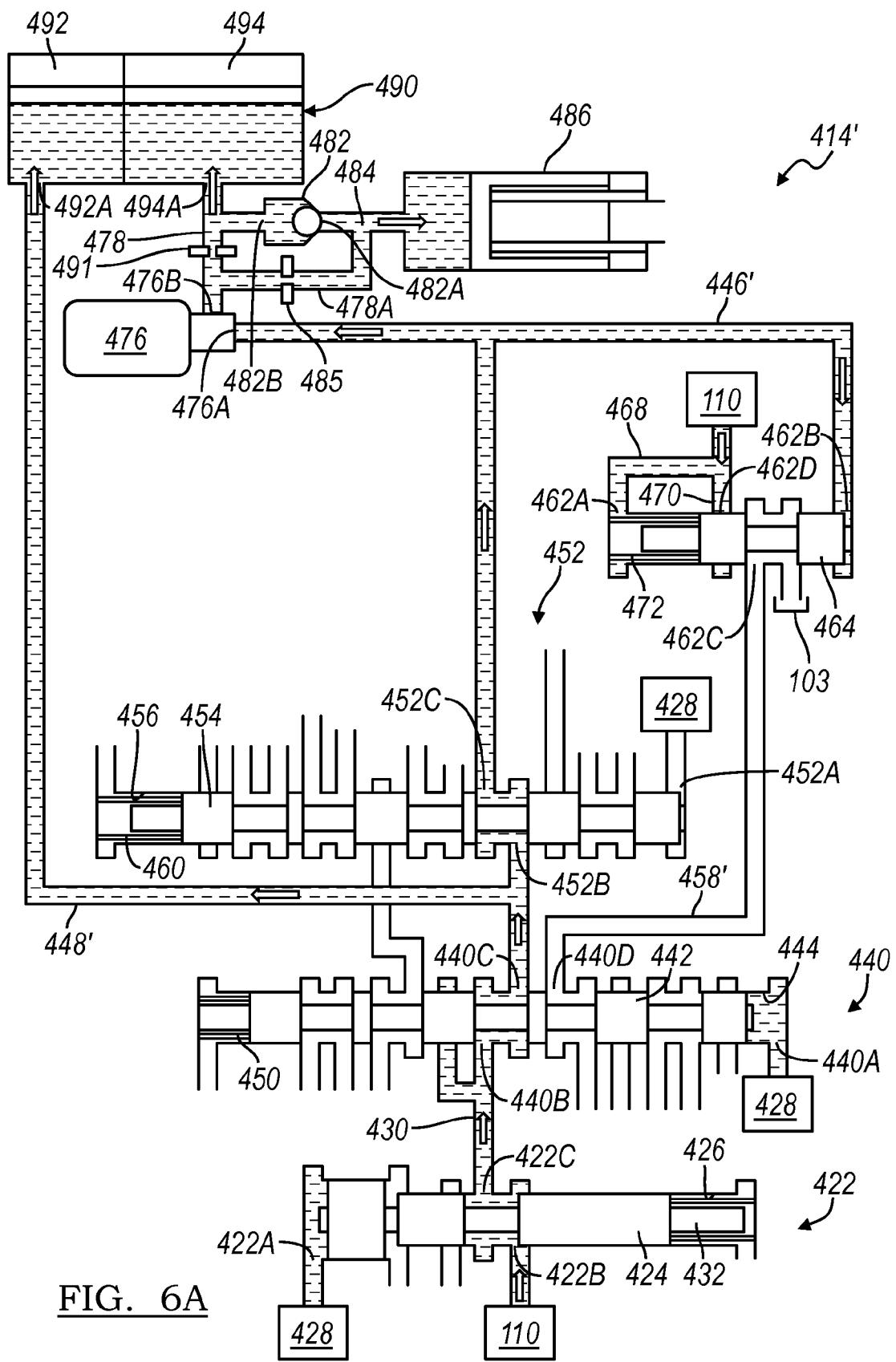
FIG. 6A is a diagram of an example of a hydraulic control system according to the principles of the present disclosure in an "engine on" mode of operation.
Figure 6B:
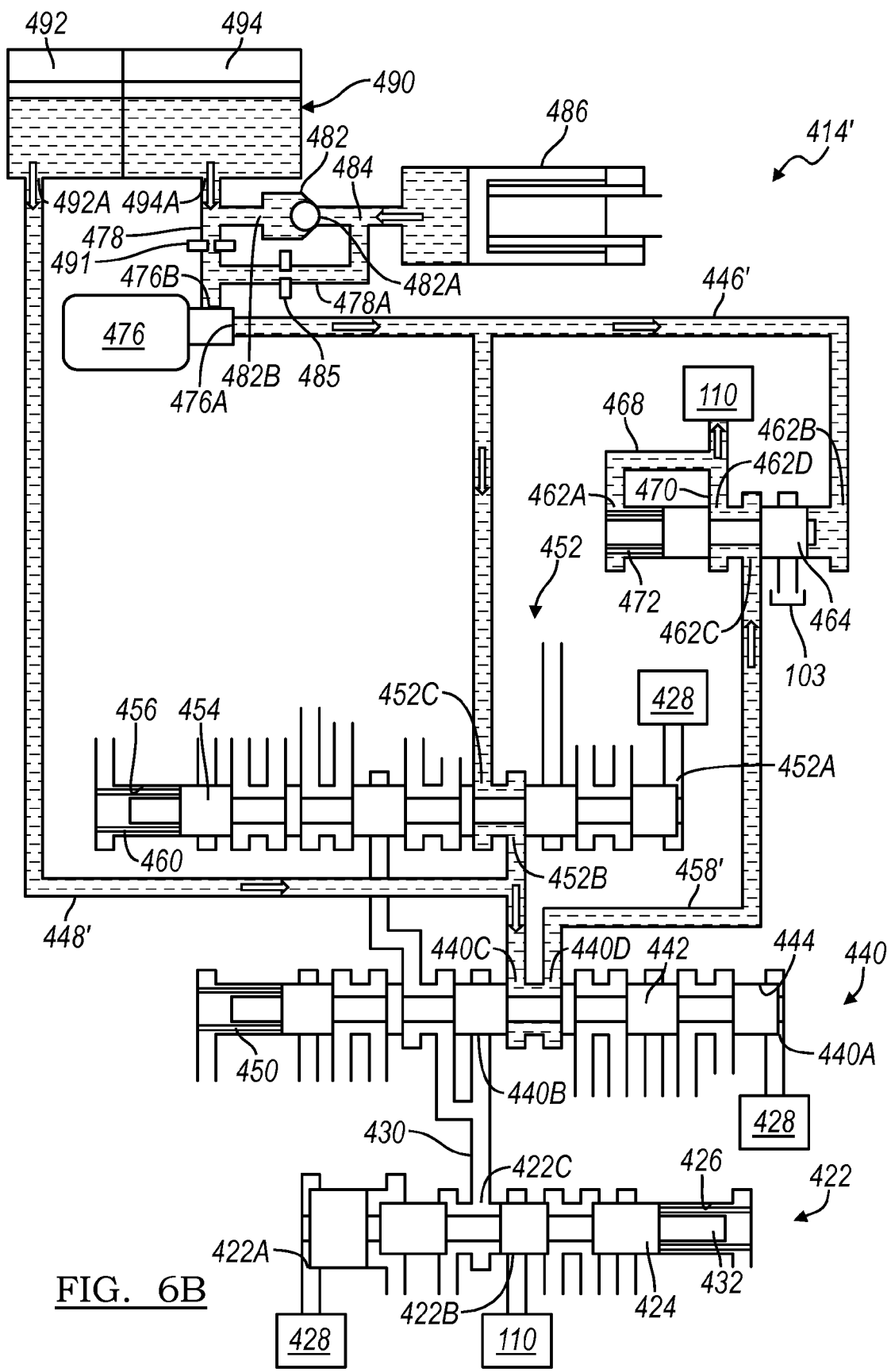
FIG. 6B is a diagram of the hydraulic control system of FIG. 6A in an "engine restart" mode of operation.

Turning to FIGS. 6A and 6B, an embodiment of the line feed subsystem 414 is generally indicated by reference number 414'. The line feed subsystem 414' is similar to the line feed subsystem 414 described in FIGS. 5A and 5B above, and therefore like components are indicated by like reference numbers. However, in the line feed subsystem 414', the third valve 452 and the relay valve 462 are connected in parallel rather than in series and the clutch actuator 480 has been replaced with a dual area clutch actuator 490. For example, fluid lines 446, 448, and 458 have been replaced with fluid lines 446', 448', and 458'. Fluid line 446' connects the solenoid 476 with the outlet port 452C of the third valve 452 and the control port 462B of the relay valve 462. Fluid line 448' connects the first outlet port 440C of the second valve 440 with the inlet port 452B of the third valve and the dual area clutch actuator 490. Fluid line 458' connects the second outlet port 440D of the second valve 440 with the inlet port 462C of the relay valve 462. In addition, the first ball check valve 474 is removed and an orifice 491 is disposed within fluid line 478.

The dual area clutch actuator 490 includes a first clutch actuator 492 and a second clutch actuator 494. The first clutch actuator 492 engages a torque transmitting mechanism that is required for motor vehicle launch. The first clutch actuator 492 includes an inlet/outlet port 492A in fluid communication with the fluid line 448'. The second clutch actuator 494 engages a torque transmitting mechanism that is not required for motor vehicle launch. The second clutch actuator 494 includes an inlet/outlet port 494A in fluid communication with the fluid line 478.

The operation of the line feed subsystem 414' will now be described. The line feed subsystem 414' operates in at least two modes: a first mode, shown in FIG. 6A, and a second mode, shown in FIG. 6B. In the first mode of operation, the engine 12 is on thereby operating the pump 104 and charging the line pressure control subsystem 110 and charging the accumulator 486 and the clutch actuator 494. In the second mode of operation the engine 12 is off or restarting and the main pump 104 is not operating or operating at a condition that provides low pressure and the accumulator 486 and the clutch actuator 494 are discharging in order to provide pressurized hydraulic fluid to the line pressure control subsystem 110 and specifically to the clutch actuator 492.

With reference to FIG. 6A, during the first mode of operation when the pump 104 is operational, the pump 104 provides pressurized hydraulic fluid to the line pressure control subsystem 110 and therefore the valve actuator subsystem 428. The valve actuator subsystem 428 moves each of the valves 422 and 440 to the stroked positions and the valve 452 is in the de-stroked position. Therefore, the line pressure control subsystem 110 provides pressurized hydraulic fluid to fluid line 420 which passes through the first valve 422 and through the second valve 440 to fluid line 448'. The hydraulic fluid from line 448' to the first clutch actuator 492 and to the third valve 452. The hydraulic fluid from the third valve 452 communicates to the fluid line 446' and through the solenoid 476 which is commanded open. The hydraulic fluid from the solenoid 476 communicates to the second clutch actuator 494 and engages the second clutch actuator 494 and communicates through the orifice 485 to charge the accumulator 486. To store the charge in the accumulator 486 and the second clutch actuator 494, the solenoid 476 is closed. Hydraulic fluid from the line pressure control subsystem 110 communicates to the relay valve 462 via fluid line 446'. The force on the valve 464 from the hydraulic fluid from the control port 462B is not sufficient to overcome the combined force on the valve 464 from the hydraulic fluid from the control port 462A and the biasing member 472, and accordingly the relay valve 462 is in the de-stroked position.

With reference to FIG. 6B, when the motor vehicle stops (i.e., at a red light for example), the engine 12 shuts off and the main pump 104 stops rotating, so there is no pressure in the hydraulic circuit providing hydraulic fluid to the line pressure control subsystem 110, and therefore to the rest of the hydraulic control system 100. To start the motor vehicle without delay, the hydraulic circuit 100 must be filled with pressurized hydraulic fluid. Accordingly, during engine restart, solenoid 476 is opened and the accumulator 486 and the second clutch actuator 494 discharge. In addition, since the valve actuator subsystem 428 is not fed hydraulic fluid from the line pressure control subsystem 110, the valves 422 and 440 move to their de-stroked positions. The hydraulic fluid from the accumulator 486 communicates through line 484, through the second ball check valve 482, to the solenoid 476. The hydraulic fluid from the second clutch actuator 494 communicates via fluid line 478 to the solenoid 476. The hydraulic fluid from the solenoid 476 communicates through line 446' to the relay valve 462. The force of the hydraulic fluid via control port 462B is greater than the force exerted on the valve 464 by the biasing member 472 and the reduced pressure of the hydraulic fluid fed from the accumulator 486 and clutch actuator 480 through the line pressure control subsystem 110. Therefore, the valve 464 is moved to the stroked position. Hydraulic fluid from fluid line 446' also communicates through the third valve 452 to the second valve 440 and to the first clutch actuator 492 via fluid line 448'. The hydraulic fluid within the second valve 440 is diverted into fluid line 458' and communicates to the relay valve 462. The hydraulic fluid communicates through the relay valve 462 and on to the line pressure control subsystem 110.

The description of the invention is merely exemplary in nature and variations that do not depart from the gist of the invention are intended to be within the scope of the invention. Such variations are not to be regarded as a departure from the spirit and scope of the invention.

We claim the following:

1. A hydraulic control system in a powertrain, the powertrain having an engine and a transmission, the transmission having a torque transmitting device, the hydraulic control system comprising:

a pump powered by the engine for providing a pressurized hydraulic fluid;

a pressure control subsystem in communication with the pump for controlling a pressure of the hydraulic fluid from the pump;

a compensator subsystem for supplying hydraulic fluid to the torque transmitting mechanism, the compensator subsystem in communication with the pressure control subsystem;

an accumulator for storing and releasing the hydraulic fluid, the accumulator in communication with the pressure control subsystem;

a first control device disposed between the accumulator and the pressure control subsystem, the first control device having an open condition for allowing fluid communication between the accumulator and the pressure control subsystem and a closed condition for preventing fluid communication between the accumulator and the pressure control subsystem;

a feed valve disposed between the pressure control subsystem, the accumulator, and the compensator subsystem, wherein the feed valve is moveable between a first position and a second position, wherein the feed valve allows communication between the pressure control subsystem and the compensator subsystem when in the first position and wherein the feed valve prevents communication between the pressure control subsystem and the compensator subsystem when in the second position; and a second control device disposed between the accumulator and the feed valve and the pressure control subsystem, the second control device having an open condition for allowing fluid communication from the accumulator to the feed valve and the pressure control subsystem and a closed condition for preventing fluid communication from the accumulator to the feed valve and the pressure control subsystem;

wherein the accumulator is charged with the hydraulic fluid when the engine is on and the first control device is open, wherein the accumulator stores the hydraulic fluid when the first control device and the second control device are closed, and wherein the accumulator releases the hydraulic fluid when the second control device is open, and wherein the feed valve is in the first position when the second control device is closed and the feed valve is in the second position when the second control device is open.

2. The hydraulic control system of claim 1 wherein the first control device is a one way ball check valve that allows fluid communication from the pressure control subsystem to the accumulator and prevents fluid communication from the accumulator to the pressure control subsystem.

3. The hydraulic control system of claim 1 wherein the second control device is an on/off solenoid.

4. The hydraulic control system of claim 1 further comprising a third control device disposed between the second control device and the feed valve and the pressure control subsystem, wherein the third control device includes an open condition for allowing fluid communication from the second control device to the pressure control subsystem and a closed condition for preventing fluid communication from the pressure control subsystem to the second control device and the feed valve.

* * * * *